3,443,695
FILTER ASSEMBLY HAVING TRAVELING
SHEET FILTER
Raymond J. O'Neill, Berkeley, Calif., assignor to De Laval
Turbine, Inc., Millbrae, Calif.
Filed May 23, 1966, Ser. No. 552,000
Int. Cl. B01d 33/00
U.S. Cl. 210—251                                    18 Claims

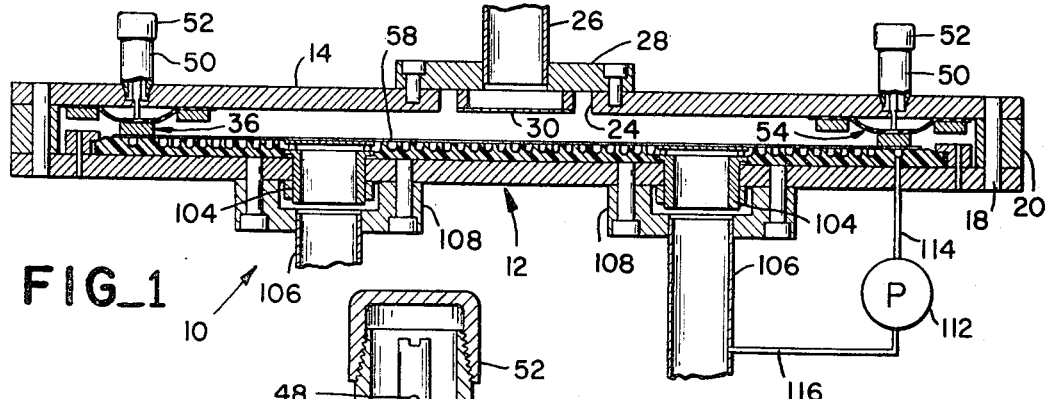
FIG_1
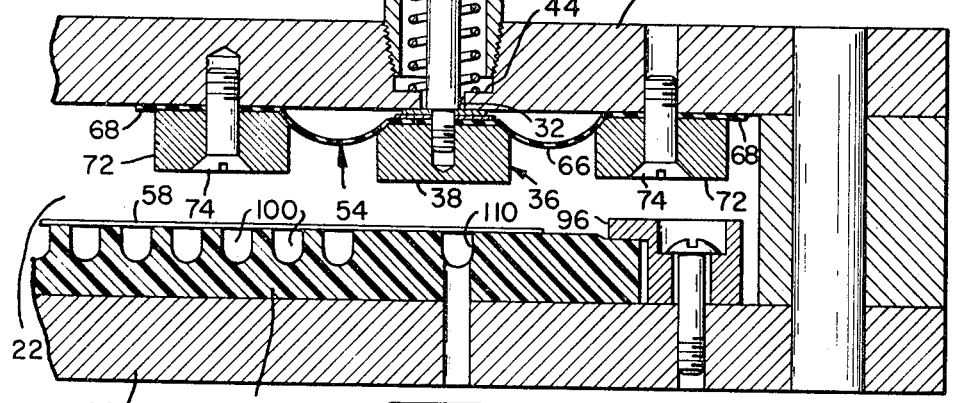
FIG_2
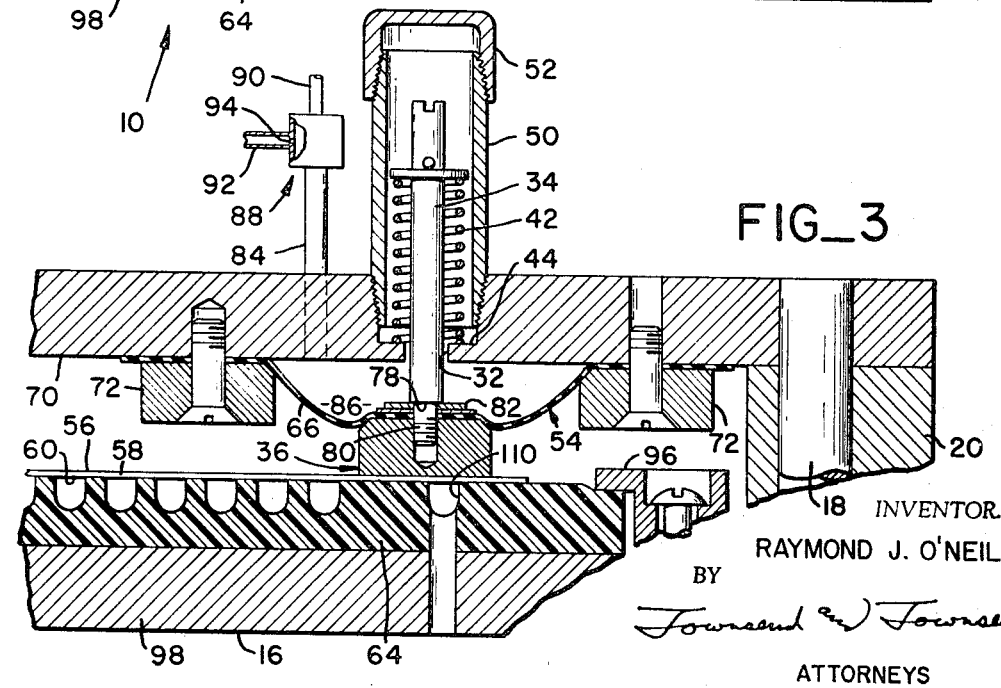
FIG_3
INVENTOR.
RAYMOND J. O'NEILL
BY
Townsend & Townsend
ATTORNEYS

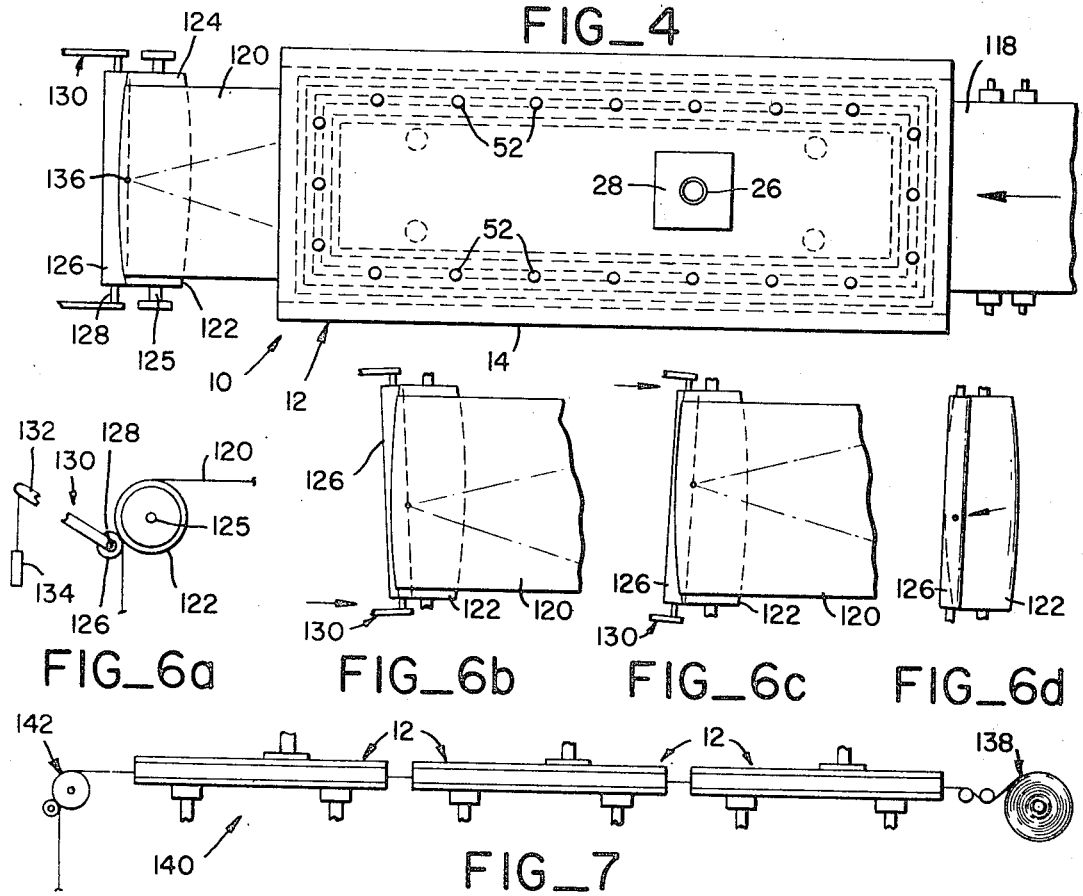
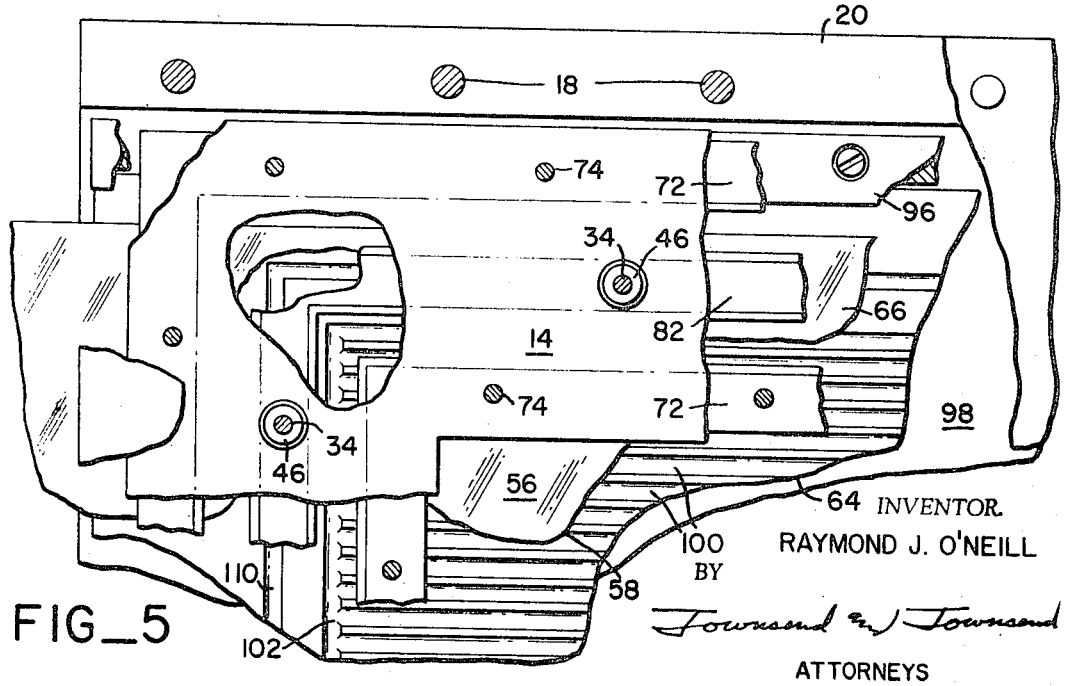

ABSTRACT OF THE DISCLOSURE

Filter assembly having a rigid, open frame movable into and out of an operative position forcing a continuous peripheral margin of a sheet of filter material against a supporting surface. Structure coupled with the frame causes the latter to be forced into the operative position whereby a fluid to be filtered can be directed along a path across which the frame and the filter material are disposed. The supporting surface may be provided with a channel aligned with the frame and coupled with a fluid device to inhibit leakage of fluid laterally of the frame.

---

This invention relates to improvements in industrial filters, and, more particularly, to filter apparatus utilizing successive portions of a movable, web-like medium.

Briefly, the invention comprises an improved seal for use with a movable filter in sheet form wherein a rigid, continuous, open frame is alternately moved into and out of an operative position in sealing engagement with a continuous side margin of the filter. The side margin of the filter is supported by a continuous surface opposed to the continuous periphery of the frame. Structure coupled with the frame is provided to force the latter into said position whereby the frame provides a positive seal engaging the adjacent face of the filter. Means is also provided to forcibly withdraw the frame from the aforesaid position to permit replacement of a used portion of the filter with a succeeding segment of the sheet defining the filter itself. The foregoing components are adapted for use with a fluid flow system with the central portion of the frame and the filter across the path of fluid flow. Because of the sealing action of the frame, the fluid may be under pressure as it passes through the filter. To avoid any possible fluid leakage along the interface between the frame and the filter, an additional continuous fluid seal may be provided which effectively prevents fluid flow laterally and outwardly of the frame.

A preferred embodiment of the invention includes a body having a pair of spaced apart walls and a pair of open ends whereby a traveling sheet of filter material may be unwound from a supply roll and passed into, through and out of the body. The above-mentioned frame is disposed within the space between the walls and is coupled by spring bias means to one of the walls to allow movement of the frame toward and away from the other wall. Inflatable structure between the aforesaid one wall and the frame is used to forcibly move the latter against a filter whereby the latter is urged against the other wall. In this position, the frame is in sealing engagement with the filter.

The spring bias mounting means always returns the frame to its starting position spaced sufficiently far enough away from the filter so that the latter is free to be shifted with respect to the body to allow replacement of a used portion having collected solids or "cake" thereon. The additional seal mentioned above comprises a continuous channel in the opposite wall, the channel being situated adjacent to and aligned with the frame so that, by coupling either a vacuum source or a fluid pressure source to the channel, fluid flow laterally and outwardly of the frame is prevented. The vacuum source draws the leakage fluid into the channel and directs it back into the fluid flow system. The fluid pressure source directs air or other suitable fluid outwardly of the channel and inwardly of the frame to block the leakage fluid. Such leakage is due to "wicking" or capillarity of the filter material, as well as to the internal pressure of the fluid to be filtered.

To move the web or sheet of filter material through the body, a pair of drive rolls are provided adjacent to the exit end of the body. These rolls drivingly engage the filter material to eliminate the need for an endless, perforate conveyor belt generally required with conventional filter equipment to shift the filter material.

The spring bias mounting means for the frame assures complete retraction of the latter when the aforesaid chamber is exhausted. The used filter material with the collected solids thereon has sufficient clearance to be moved out of the space between the walls of the body without permitting such solids to contact the sealing surface of the frame. In certain conventional filter apparatus, an inflatable, expandable gasket is used for sealing purposes and for forcing the sheet of filter material against an opposite wall. However, such a gasket eventually suffers a permanent set and remains at least partially expanded when deflated. Thus, it periodically deflates to a lesser degree and finally requires replacement if the collected solids and the used portion of a sheet of filter material are to be effectively removed from the fluid flow path.

The flexible member which provides the chamber by means of which the frame is moved cannot suffer such a permanent set because the spring action of the bias structure automatically returns the frame to its normal, starting position. When the chamber is inflated, the member acts as a bellows to move the frame through the necessary distance to effect the fluid seal, thus allowing the fluid to be filtered to be under a predetermined pressure. The present invention therefore avoids the problems encountered with filter apparatus having the aforesaid inflatable gaskets as well as the problems associated with the use of gravity feed system using a number of vertically spaced sheets of filter material.

It is therefore the primary object of this invention to provide an improved filter assembly utilizing a traveling sheet filter across a fluid flow path wherein a rigid, shiftable, spring biased, continuous frame disposed about the path is moved by inflatable structure into a position in sealing engagement with a continuous, outer margin of the sheet and forces it against a stationary continuous surface to fixedly position the sheet across said path, whereby the sheet becomes a disposable part of the assembly by virtue of the sealing action of the frame and the stationary surface when the frame is in said position and the frame will always return to its starting position by the spring bias exerted thereon to permit disposal of the sheet and the impurities collected thereon. Thus, the problems associated with the above-mentioned inflatable gaskets are circumvented.

Another object of the present invention is the provision of filter apparatus of the type described which includes drive means engageable with the filter material itself for moving the latter with respect to the frame so as to eliminate the necessity for an endless, perforate conveyor belt which has heretofore been required in conventional filter equipment of this nature to replace and dispose of the filter material.

Yet a further object of this invention is the provision of a frame mounting structure including a plurality of spaced coil springs which allow movement of the frame with respect to the filter material whereby the springs always return the frame to its starting position when the filter material is to be replaced to thereby assure sufficient clearance for removal of this material without contacting any of the structural parts comprising the apparatus.

Still another object of the invention is to provide filter apparatus of the aforesaid character wherein supplemental sealing means is provided on the opposite side of the filter material from the frame to prevent a leakage of the fluid to be filtered laterally of the fluid flow path at the junction of the frame and filter material itself.

A further object of the invention is to provide a plurality of aligned, independent filter units usable with a movable sheet of filter material initially in roll form whereby the filtering capacity of the overall system is relatively large and the used filter material can be readily disposed of by the use of the rigid, spring biased, continuous frame concept set forth hereinabove.

Other objects of this invention will become apparent as the specification progresses, reference being had to the accompanying drawing wherein:

FIG. 1 is a vertical section through the filter apparatus with the rigid frame in its operative position against a traveling sheet of filter material;

FIG. 2 is an enlarged, fragmentary view similar to FIG. 1 but illustrating the frame in its retracted position;

FIG. 3 is a view similar to FIG. 2 by illustrating the frame in its operative position;

FIG. 4 is a top plan view of the apparatus;

FIG. 5 is a fragmentary view of FIG. 4, partly broken away and in section to illustrate the various parts thereof;

FIGS. 6a–6d are views of the drive means for advancing the filter material with respect to the frame; and FIG. 7 is a side elevational view of another form of the invention utilizing three individual filter units in combination with a traveling sheet filter.

Filter apparatus 10 is illustrated in its preferred form in FIGS. 1–3 and includes a body 12 having a pair of vertically spaced walls 14 and 16 interconnected at side extremities by pins 18 and blocks 20. Body 12 is open at a pair of opposed ends thereof, one of such ends being denoted by the numeral 22 and being illustrated in FIG. 2. Ends 22 permit a sheet or web of filter material to pass into body 12 through one of its open ends, through the body and out of the same through the opposite end. Apparatus 10 is to be utilized with a supply of filter material initially in roll form in the manner shown in FIG. 7.

Wall 14 has a hole 24 therethrough which is in communication with an inlet pipe 26 through which a fluid passes as it moves toward the space between walls 14 and 16. Mounting structure 28 secures pipe 26 to the upper surface of wall 14. A diffusion plate 30 directs the fluid entering body 12 so that the fluid is moved in all directions.

Wall 14 is provided with a number of spaced openings 32 adjacent to the side margins thereof for receiving respective pins 34 which are threaded into and project outwardly from the upper surface of a rigid, continuous, shiftable frame 36 disposed between walls 14 and 16. Frame 36 may be in the form of a ring or have a rectangular configuration and, in the form illustrated in FIGS. 1–3, frame 36 has a flat, lower surface 38 surrounding a central opening 40 aligned with hole 24 as shown in FIG. 1.

A coil spring 42 is provided with each pin 34 respectively, each spring 42 surrounding its pin 34 and resting on an annular shoulder 44 formed on wall 14. The upper end of each spring 42 supports a ring 46 which bears against a pin 48 passing through the corresponding pin 34. A cylindrical housing 50 is threaded into wall 14 and surrounds pin 34 and its spring 42. A cap 52 is threadably mounted on the other end of housing 50 and seals the same.

Since pins 34 are spaced along frame 36, the latter is movable toward and away from wall 16. However, springs 42 bias frame 36 into its position illustrated in FIG. 2 wherein surface 38 thereof is spaced upwardly from wall 16. Inflatable structure 54 is coupled with frame 38 to move it into the position thereof shown in FIG. 3 wherein it engages a continuous side margin of one face 56 of a sheet 58 of filter material. This action forces the corresponding continuous side margin of the opposite face 60 of sheet 58 into engagement with the adjacent face 62 of a resilient pad 64 forming a part of wall 16.

Structure 54 includes a sheet 66 of flexible, relatively inextensible material having a pair of opposed side margins 68 which are clamped to the inner surface 70 of wall 14 by continuous bands 72 secured to wall 14 by threaded fasteners 74. The central portion 76 of sheet 66 is connected to the upper surface of frame 36 in any suitable manner. As shown, each pin 34 has an annular shoulder 78 which defines a reduced end 80 receiving a washer 82 which forces central portion 76 into sealed relationship with frame 36.

A conduit 84 extends through wall 14 and communicates with the inflatable chamber 86 defined by sheet 66. A three-way valve 88 is connected to conduit 84 and has a first section 90 for coupling conduit 84 to a source of fluid under pressure. A second section 92 allows chamber 86 to be exhausted to the atmosphere when it is desired to deflate the same. Section 92 has a discharge orifice 94 which limits the rate at which fluid is discharged from chamber 86. Valve 88 may be of any construction but preferably is of the solenoid type so that it may be remotely and electrically actuated.

Wall 16, in addition to pad 64, includes a clamp 96 for holding pad 64 to the lower portion 98 thereof. Pad 64 has a plurality of parallel grooves 100 formed in the upper surface thereof, all such grooves 100 being in fluid communication with each other by virtue of a transverse groove 102 adjacent to their ends as shown in FIG. 5. The structure between adjacent grooves 100 defines a supporting surface for the underside of sheet 58.

Wall 16 has a pair of outlet tubes 104 which communicate with adjacent grooves 100. Tubes 104 are mounted in any suitable manner and communicate with outlet pipes 106 secured to wall 16 by mounting structure 108. Pipes 26 and 106 form part of a fluid flow system across which it is desired to removably place sheet 58 whereby impurities in the fluid flowing through the system can be separated from the fluid and collected upon face 56 of sheet 58.

Pad 64 is provided with a continuous channel 110 having an open, uppermost extremity directly adjacent to the bottom face 60 of sheet 58. Moreover, channel 110 is vertically aligned with frame 36 and effectively underlies the same when the frame is in its operative position shown in FIG. 3.

A vacuum pump 112 has an inlet end coupled by a conduit 114 to channel 110. The outlet end of pump 112 is coupled by a conduit 116 to one of the pipes 106.

Apparatus 10 also includes a roll of filter material defining the source from which sheet 58 emanates. Such roll is not shown in FIG. 4; however, the length 118 extending from the roll into body 12 is shown in FIG. 4. An additional length 120 is shown to the left of FIG. 4, extending outwardly from body 12 and passing between a drive roller 122 having a convex outer surface 124 and a rotatable shaft 125 normally disposed transversely of the path of travel of sheet 58.

A cylindrical pressure roller 126 is rotatably mounted on a shaft 128 having a frame 130 connected to its ends as shown in FIGS. 4 and 6. Frame 130 is, as shown in FIG. 6a, pivoted about an axis 132 which is normally parallel to shaft 125. A counterweight 134 biases pressure roller 126 toward drive roller 122, the latter being driven in any suitable manner such as by coupling shaft 128 to a drive motor.

Frame 130 is also shiftable in the manner illustrated in FIGS. 6b and 6c whereby the location 136 at which pressure roller 126 is in closest proximity to drive roller 122 may be shifted axially of the latter to compensate for any tendency of length 120 to move laterally of drive roller 122. As shown in FIG. 4, location 136 is midway between the ends of drive roller 122, in FIG. 6b it is off-center and closer to one of the ends, and in FIG. 6c it is also off-center and closer to the opposite end. FIG. 6d illustrates the underside of the rollers for the condition shown in FIG. 6c.

FIG. 7 illustrates a modified form of the invention wherein three aligned bodies 12 are utilized with a roll 138 of flexible filter material to provide filter apparatus 140 having a relatively large capacity. Each body 12 is constructed in the manner illustrated in FIGS. 1–3, there being drive means 142 coupled with the downstream end of the sheet of filter material to advance the latter simultaneously relative to the three aligned bodies and to effect replacement and disposal of used filter material. Drive means 142 is substantially identical in all respects to the drive means including rollers 122 and 126 as shown in FIGS. 4 and 6.

In the operation of apparatus 10, filter material in the form of sheet 58 is at the outset manually directed into the entrance end of body 12, is advanced through the body and out of the exit end for disposition between rollers 122 and 126. One portion of the filter material is then ready to be used to filter the fluid, such as a liquid containing suspended solids passing through pipe 26 and into body 12 through hole 24.

Before the fluid flow into the body is established, valve 88 is actuated to admit a fluid, such as air under pressure into chamber 86. This action causes inflation of the chamber, whereby frame 36 is moved from its starting position shown in FIG. 2 to its operative position shown in FIG. 3. Springs 42 are compressed and thereby exert an upward bias force on respective pins 34, whereby frame 36 is automatically retracted when chamber 86 is deflated.

Frame 36 forces the adjacent, continuous side margin of sheet 58 into firm engagement with pad 64 to effect a seal therebetween. Pump 112 may be actuated to create a partial vacuum in channel 110 to draw thereinto any fluid which tends to seep between frame 36 and pad 64. In the alternative, pump 112 may comprise a source of fluid under pressure such as an air compressor whereby the pressurized fluid is directed into channel 110 to thereby subject the latter to a pressure greater than the fluid pressure in the passage surrounded frame 36 and sheet 66. In this situation, part of the fluid emerging from channel 110 will pass inwardly of frame 36 and counter any fluid leakage from within the same. The remaining portion of the fluid emanating from channel 110 will flow outwardly of frame 36 and into the atmosphere.

It is to be emphasized that the material defining sheet 58 is porous and "wicking" or capillarity action will ordinarily occur in the case of liquids flowing into body 12 from pipe 26. Nonetheless, this "wicking" will be countered by the seal defined by channel 110 and pump 112 regardless of whether or not the pump is a vacuum source or a source of fluid under pressure.

Upon establishing the fluid flow through pipe 26, the fluid may be under pressure since the fluid passage surrounded by frame 36 and structure 54 is effectively closed and intersected by sheet 58. Suspended solids in the fluid will be collected on upper face 56 of sheet 58 while the filtered fluid will pass through the interstices of sheet 58 and into grooves 100 for flow into pipes 106.

When it is desired to replace and dispose of sheet 58, chamber 86 is deflated by again actuating valve 88 so that the fluid under pressure in the chamber will be exhausted to the atmosphere through section 92 of valve 88 and specifically through the discharge orifice 94. As chamber 86 is exhausted, the compressed springs 42 return frame 36 to its initial position. However, orifice 94 controls the rate of return and prevents the frame from snapping upwardly and thereby assures that flat surface 38 of frame 36 will remain free from contact with the impurities collected on face 56. Otherwise, solids might well collect on surface 38 and inhibit the sealing action of frame 36 when the latter is next moved into its operative position shown in FIG. 3.

When frame 36 has been retracted, the filter material is advanced by the rotation of drive roller 122, frame 36 being elevated to a sufficient distance to permit removal of sheet 58 from body 12 without contacting any structure adjacent to its path of travel. Thus, apparatus 10 remains substantially clean at all times and is again ready for filtering the material as soon as the clean portion of the filter material becomes aligned with the fluid passage defined by opening 40 of frame 36.

Apparatus 10 is simple and rugged in construction and requires a minimum of maintenance since it is only necessary to replace the filter material at periodic intervals. Frame 36, being rigid and continuous, provides an effective seal when it is in its operative position. Moreover, springs 42 return the frame to its initial position each time chamber 86 is deflated, thus assuring proper clearance for removal of the used sheet 58 containing the collected solids thereon. Also, an endless, flexible, perforate conveyor belt is not needed to move filter material through body 12. Thus, the requirement to keep such a belt clean is avoided.

While one embodiment of this invention has been shown and described, it will be apparent that other adaptations and modifictaions can be made without departing from the true spirit and scope of the invention.

What is claimed is:

1. Filter apparatus comprising: a pair of fixed, spaced walls adapted to receive a sheet of filter material therebetween, one of the walls having a fluid inlet and the other wall having a fluid outlet; a rigid frame having a central opening and a continuous periphery surrounding the opening; a number of spaced pins secured to and extending outwardly from said frame in a direction away from said other wall; means shiftably mounting the pins on said one wall and biasing the same in said direction so that said frame is coupled to and biased toward said one wall, said frame being movable into and out of a position with said periphery thereof forcing a sheet of filter material against said other wall; inflatable means attached to and between said one wall and said frame for moving the latter into said position, said structure defining a fluid passage aligned with said inlet and said outlet when the frame is in said position; and means coupled with said structure for inflating the same.

2. Filter apparatus as set forth in claim 1, wherein said mounting and biasing means includes a coil spring for each pin respectively, the springs surrounding respective pins and being axially compressible as said frame moves into said position.

3. Filter apparatus as set forth in claim 1, wherein said one wall is disposed above said other wall, said pins being vertically disposed, said one wall having an opening therethrough for each pin respectively, the pins extending through respective openings, said mounting and biasing means including a coil spring surrounding each pin respectively, the springs being in engagement with said one wall and coupled with respective pins at locations thereon externally of said region, whereby the springs are axially compressed as the frame moves into said position.

4. Filter apparatus as set forth in claim 1, wherein said frame has a flat surface defining the sheet-engaging portion of said surface.

5. Filter apparatus as set forth in claim 1, wherein said frame has a flat, sheet-engaging surface at said periphery, said other wall having a flat, continuous, resilient surface opposed to said flat surface of said frame, whereby the opposed sides of a sheet of filter material is engaged by said surfaces when the frame is in said position.

6. Filter apparatus as set forth in claim 1, wherein said frame has a flat, sheet-engaging surface at said periphery, said other wall having a continuous channel opposed to said flat surface of the frame, a continuous margin of a sheet of filter material being between said flat surface and said channel when said frame is in said position, and means coupled with said channel for subjecting the latter to a fluid pressure different from the fluid pressure in said passage.

7. Filter apparatus as set forth in claim 1, wherein said frame has a flat, sheet-engaging surface at said periphery, said other wall having a continuous channel opposed to said flat surface of the frame, a continuous margin of a sheet of filter material being between said flat surface and said channel when said frame is in said position, and a fluid pump coupled with said channel for maintaining the air pressure therein at a value above the fluid pressure in said passage.

8. Filter apparatus as set forth in claim 1, wherein said walls define a body having a pair of spaced, open ends permitting a sheet of filter material to pass into, through and out of the body, means adjacent to the entrance end of said body for supplying said sheet, and means adjacent to the exit end of said body for advancing the sheet therethrough.

9. Filter apparatus as set forth in claim 1, wherein said walls define a body having a pair of spaced, open ends permitting a sheet of filter material to pass into, through and out of the body, means adjacent to the entrance end of said body for supplying said sheet, a drive roller rotatably mounted at a location spaced from and adjacent to the exit end of the body, said roller having a convex outer, sheet-engaging surface, a cylindrical pressure roller adjacent to said drive roller and disposed for urging a sheet of filter material into driving engagement with said drive roller at a location thereon intermediate its ends, and means coupled with said pressure roller for shifting its axis of rotation relative to said drive roller in a direction to vary the location at which said sheet is forced into driving engagement with the drive roller.

10. Filter apparatus comprising: a body having a pair of open ends and a pair of spaced walls extending between said ends, one of the walls having a fluid inlet and the other wall having a fluid outlet, said body being adapted to receive a sheet of filter material through one of its open ends and to allow the sheet to exit through the other open end; a roll of flexible filter material adjacent to and aligned with said one end of the body, a length of said filter material extending outwardly from said roll and being received in said body through said one end thereof; a rigid, continuous frame within said body and having a pair of opposed sides, one of the sides being flat; a plurality of spaced pins secured to and extending outwardly from the other side of the frame, said one wall having an aperture therethrough for each pin respectively, the pins extending through respective apertures and being shiftable relative thereto; a coil spring for each pin respectively, the coil spring surrounding respective pins and extending outwardly from respective apertures in surrounding relationship thereto, said coil springs being coupled to their pins and being compressible as the pins move inwardly of the apertures, whereby the frame is biased toward said one wall and is movable toward and away from said other wall, the latter having a continuous, resilient margin aligned with said frame and disposed to engage one face of said length of filter material as said frame is moved into a position with its one side forcibly engaging the opposite face of said length, whereby the filter material is fixedly held against said other wall; a sheet of flexible material having a pair of opposed side margins and a length equal to the perimeter of said frame; means securing the side margins of the sheet to said one wall and the central portion of the sheet to said frame to define a continuous, inflatable chamber disposed to move the frame into said position when the chamber is inflated and to allow the compression force of said springs to return the frame to its initial position when the chamber is deflated; a conduit extending through said one wall and adapted to be secured to a fluid under pressure; valve means coupled to said conduit to control the flow of fluid into and out of said chamber, whereby the chamber is alternately inflated and deflated to thereby effect movement of the frame into and out of said position, said frame and said sheet defining a sealed fluid passage aligned with said inlet and said outlet when the frame is in said position.

11. Filter apparatus as set forth in claim 10, wherein is included fluid sealing means at said side margin of said other wall to prevent fluid flowing through said passage to flow laterally thereof.

12. Filter apparatus as set forth in claim 10, wherein the inner surface of said side margin of the other wall is provided with a continuous channel, and including means coupled with said channel for subjecting the same to a fluid pressure different from the fluid pressure of said passage.

13. Filter apparatus as set forth in claim 10, wherein the inner surface of said side margin of the other wall is provided with a continuous channel, and including a vacuum device having an inlet in fluid communication with said channel and an outlet in fluid communication with said fluid outlet of said other wall.

14. Filter apparatus as set forth in claim 10, wherein the inner surface of said side margin of the other wall is provided with a continuous channel, and including a source of fluid under pressure coupled with said channel.

15. Filter apparatus comprising: a number of aligned filter units, each unit including a pair of fixed spaced walls and a pair of spaced open ends, one of the walls having a fluid inlet and the other wall having a fluid outlet, a rigid frame having a central opening and a continuous periphery surrounding the opening, the frame being disposed between the spaced walls of the unit, a number of spaced pins secured to and extending outwardly from the frame toward said one wall, spring means shiftably mounting the pins on said one wall and biasing the same away from the other wall so that said frame is coupled to and biased toward said one wall and is movable into and out of a position with said periphery thereof forcing a sheet of filter material against said other wall, inflatable means attached to and between said one wall and said frame for moving the latter into said position, said structure defining a fluid passage aligned with said inlet and said outlet when the frame is in said position, and means coupled with said structure for inflating the same; a roll of flexible filter material disposed adjacent to one of open ends of one unit, the filter material extending outwardly from the roll and through said units, the frames of the units being movable into respective positions to fixedly position corresponding portions of the filter material across respective fluid passages; and selectively actuatable drive means engageable with the outermost extremity of the filter material for advancing the same with respect to said units, whereby used portions of the filter material can be replaced with unused portions after said frames have been moved out of respective positions permitting the filter material to move freely through the units under the influence of said drive means.

16. Filter apparatus comprising: a pair of fixed, spaced walls adapted to receive a sheet of filter material therebetween, one of the walls having a fluid inlet and the other wall having a fluid outlet; a rigid frame having a central opening, a continuous periphery surrounding the opening, and a flat, sheet-engaging surface at said periphery, said other wall having a continuous channel opposed to said flat surface of the frame; a number of spaced pins secured to and extending outwardly from said frame in a direction away from said other wall; means shiftably mounting the pins on said one wall and biasing the same in said direction, whereby said frame is coupled to and biased toward said one wall, said frame being movable into and out of a position with said periphery thereof forcing a sheet of filter material against said other wall; a continuous margin of a sheet of filter material being between said flat surface and said channel when said frame is in said position; inflatable structure between said one wall and said frame for moving the latter into said position, said structure defining a fluid passage aligned with said inlet, said outlet and said opening when the frame is in said position; means coupled with said structure for inflating the same; and a vacuum pump coupled to said channel for reducing the air pressure therewithin to a value below the fluid pressure in said passage, whereby fluid moving outwardly of said passage between said walls will be urged into said channel.

17. Apparatus for placing a movable filter across a fluid flow line comprising: a support; a rigid frame adjacent to the support, the frame having a central opening and a continuous periphery surrounding the opening; structure defining a continuous surface in alignment with said pheriphery; said structure having a first fluid passage therethrough; inflatable means coupled with the support for moving the frame relative to said surface from a first position spaced therefrom to a second position adjacent thereto and in sealing engagement with a filter, said frame and said inflatable means defining a second fluid passage communicating with said first fluid passage when the frame is in said second position; means coupled with the support for forcibly withdrawing the frame from said second position when said inflatable means is deactuated; and means coupled with the support for placing the fluid passages in communication with a fluid flow line.

18. Apparatus as set forth in claim 17, wherein is included a fluid seal adjacent to the zone of sealing action of said frame and disposed to impede the leakage of fluid laterally and outwardly of the frame.

References Cited

UNITED STATES PATENTS

| 2,867,324 | 1/1959 | Hirs | 210—138 |
| 3,138,015 | 6/1964 | Avery | 210—387 |

FOREIGN PATENTS

| 929,079 | 6/1963 | Great Britain. |

REUBEN FRIEDMAN, *Primary Examiner.*

CHARLES N. HART, *Assistant Examiner.*

U.S. Cl. X.R.

210—387